Oct. 9, 1962 E. A. MEYER 3,057,618
ACCESSORY DEVICE FOR MACHINE-TOOLS, MORE
PARTICULARLY FOR TOOL-MAKERS' LATHE
Filed Aug. 3, 1959

INVENTOR.
ERNEST AUGUSTE MEYER
BY
Irwin S. Thompson
ATTY.

United States Patent Office 3,057,618
Patented Oct. 9, 1962

3,057,618
ACCESSORY DEVICE FOR MACHINE-TOOLS, MORE PARTICULARLY FOR TOOL-MAKERS' LATHE
Ernest Auguste Meyer, Geneva, Switzerland, assignor to Chaskiel-Henryk Borzykowski and Boruch-Boris Borzykowski, both of Geneva, Switzerland
Filed Aug. 3, 1959, Ser. No. 831,177
Claims priority, application Switzerland Aug. 5, 1958
1 Claim. (Cl. 269—95)

The present invention relates to an accessory device for machine-tools, more particularly for tool-makers' lathe, characterized by the fact that it is constituted by a table capable of supporting a part to be machined and elements for ensuring the fastening of said part, this table comprising means enabling it to be fastened, on the one hand, to the revolving spindle and, on the other hand, to the tailstock of the machine.

Preferably, the device is constituted by a circular table on which it is possible to mount a vice, said table comprising two trunnions placed on the same theoretical axis, one being coupled to the machine by a clamping element, the other co-operating with the tail-stock.

The attached drawing shows, by way of example, an embodiment of the device in accordance with the invention.

Figure 1:
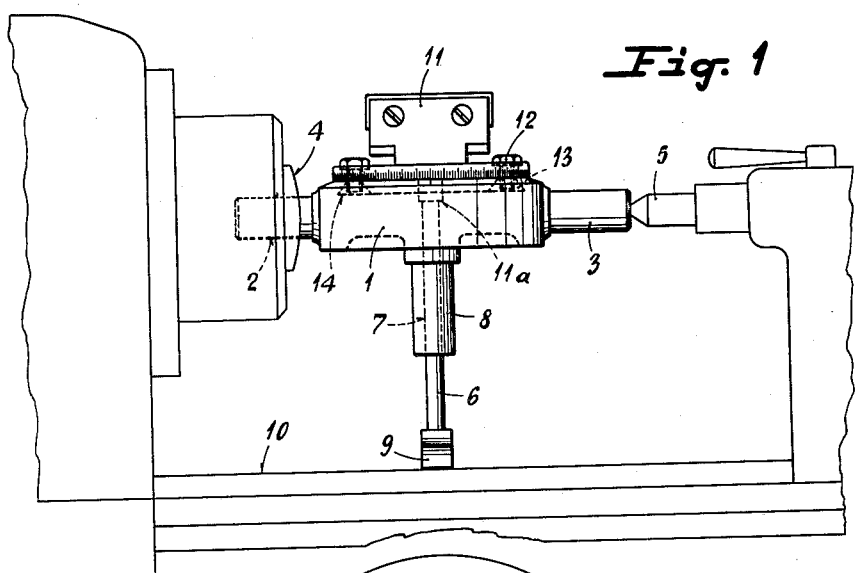
FIG. 1 is a front view of the device mounted on a tool-makers' lathe.
Figure 2:
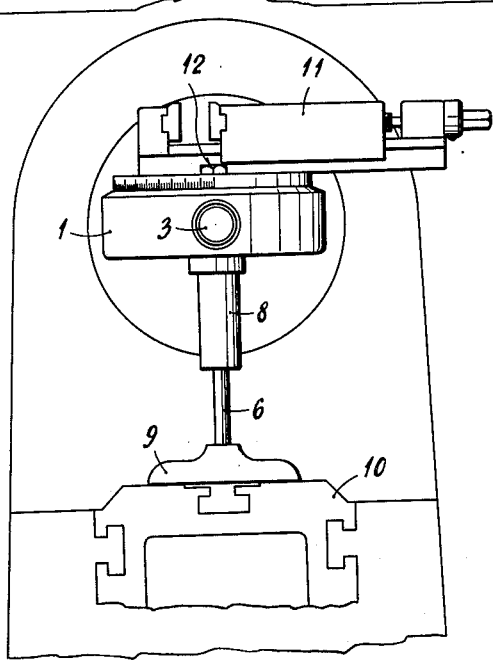
FIG. 2 is a profile view.

The device represented on the drawing is constituted by a circular table 1, comprising two trunnions 2, 3 placed on a same theoretical axis, the first being coupled to the revolving spindle of the fixed stock of the lathe by a conical grip 4, the second presenting a centering conical housing in which is engaged the tip of the tail-stock 5 carried by the head-stock of the machine.

The table also comprises an adjustment foot 6 perpendicular to the axis of the trunnions 2, 3 and capable of sliding inside a boring 7 provided in the table 1, which presents a protuberance 8 to enable said foot to be guided over an extended portion of its length. The latter is fitted at its lower part with a ruler 9 intended to be applied to the surface of the lathe bed 10 in order to place the table in such a way that its upper surface should be quite parallel to the said surface of the lathe bed 10. When the contact between the lathe bed 10 and the ruler 9 is established over the whole length of the latter, the conical grip 4 is gripped, the spindle having previously been blocked, then the tail-stock 5 is brought to the bottom of the housing provided at the end of the trunnion 3. The table is thus rigidly maintained between the two head stocks of the machine.

In the embodiment represented by the drawing, the table 1 constitutes the support of a parallel vice 11. The latter is fastened by means of a central pivot 11a and two screws 12 co-operating with nuts 13 housed in a circular groove 14 provided in the table 1. This arrangement enables a revolving displacement to be imparted to the vice 11 in relation to the table 1, and to fasten it in any angular position on the horizontal plane. The circular base of the vice may be provided with a scale to place it accurately in a determined position in relation to a pointer marked on the surface of the table 1 situated in front of the said scale. The above described mounting of the table also enables the position of the vice on the vertical plane to be changed. It is sufficient for this purpose, to impart an angular displacement to the spindle of the head-stock of the machine.

The device in accordance with the invention is able to perform many operations such as drilling, milling, grinding etc. . . . , by means of tools mounted on the mobile carriage of the lathe, which gives it a universal character. Its reduced bulk enables it to be mounted on machines of small dimensions.

It goes without saying that the invention has been only described and represented by way of example and that many detail modifications could be applied to it without going out of its scope.

I claim:

An accessory device for machine-tools, more particularly for tool-makers' lathe, said device having a table capable of supporting a part to be machined and means to ensure the fastening of said part, two members solid with said table, one of the said members being adapted to be mounted to the revolving spindle of the lathe, the other member co-operating with the tail-stock of said lathe, an adjustment foot solid with said table and perpendicular to the surface of the latter, and a ruler slidably mounted in said foot and intended for being applied to the surface of the lathe bed in order to ensure the parallelism between the said surfaces of the lathe bed and the table.

References Cited in the file of this patent
UNITED STATES PATENTS

| | | |
|---|---|---|
| 414,174 | Trask | Oct. 29, 1889 |
| 782,240 | Hanson | Feb. 14, 1905 |
| 2,363,230 | Condon | Nov. 21, 1944 |
| 2,386,145 | Ruysdael | Oct. 21, 1945 |
| 2,430,366 | Porterfield | Nov. 4, 1947 |
| 2,441,413 | Hassig | May 11, 1948 |
| 2,521,231 | Larson | Sept. 5, 1950 |
| 2,595,137 | Hagopian | Apr. 29, 1952 |
| 2,688,904 | Richter | Sept. 14, 1954 |
| 2,925,017 | Bales | Feb. 16, 1960 |